US011948305B2

(12) United States Patent
Nie et al.

(10) Patent No.: US 11,948,305 B2
(45) Date of Patent: Apr. 2, 2024

(54) METHOD AND SYSTEM FOR SEGMENTING LUNG IMAGE, AND STORAGE MEDIUM

(71) Applicant: GE Precision Healthcare LLC, Wauwatosa, WI (US)

(72) Inventors: Yingbin Nie, Guangzhou (CN); Zhoushe Zhao, Beijing (CN); Chen Zhang, Guangzhou (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 319 days.

(21) Appl. No.: 17/342,192

(22) Filed: Jun. 8, 2021

(65) Prior Publication Data

US 2021/0390703 A1 Dec. 16, 2021

(30) Foreign Application Priority Data

Jun. 11, 2020 (CN) .......................... 202010530332.6

(51) Int. Cl.
*G06T 7/187* (2017.01)
*G06T 5/30* (2006.01)
*G06T 7/11* (2017.01)
*G06T 7/155* (2017.01)

(52) U.S. Cl.
CPC ............... *G06T 7/11* (2017.01); *G06T 5/30* (2013.01); *G06T 7/155* (2017.01); *G06T 7/187* (2017.01); *G06T 2207/10081* (2013.01); *G06T 2207/20081* (2013.01); *G06T 2207/20132* (2013.01); *G06T 2207/20221* (2013.01); *G06T 2207/30061* (2013.01); *G06T 2207/30101* (2013.01)

(58) Field of Classification Search
CPC ......................................................... G06T 7/11
See application file for complete search history.

(56) References Cited

U.S. PATENT DOCUMENTS

| 11,436,720 | B2* | 9/2022 | Gong | G06N 3/045 |
|---|---|---|---|---|
| 2010/0041949 | A1* | 2/2010 | Tolkowsky | A61B 5/066 |
| | | | | 600/117 |
| 2018/0228450 | A1* | 8/2018 | Vega | A61B 6/545 |
| 2020/0410670 | A1* | 12/2020 | Gerard | G06T 7/143 |

FOREIGN PATENT DOCUMENTS

| CN | 109636808 A | 4/2019 |
|---|---|---|
| CN | 109727260 A | 5/2019 |
| CN | 109886967 A | 6/2019 |
| CN | 109584252 B | 8/2020 |
| CN | 110211695 B | 8/2021 |

OTHER PUBLICATIONS

George et al ("Pathological Pulmonary Lobe Segmentation from CT images Using Progressive Holistically Nested Neural Networks and Random Walker, ResearchGate, DOI: 10.1007/978-3-319-67558-9_23, Sep. 2017") (Year: 2017).*

* cited by examiner

*Primary Examiner* — Oneal R Mistry

(57) ABSTRACT

The present disclosure relates to a method, a system, and a storage medium for segmenting a lung image. The method for segmenting a lung image comprises: obtaining medical image data containing a lung region; performing lung lobe segmentation on the medical image data to generate a plurality of lung lobe data subsets; generating updated lung image data based on one or a plurality of lung lobe data subsets in the plurality of lung lobe data subsets; and performing nidus segmentation on the updated lung image data to generate a segmentation image that identifies a pneumonia nidus.

23 Claims, 11 Drawing Sheets

Before preprocessing

After preprocessing

METHOD AND SYSTEM FOR SEGMENTING LUNG IMAGE, AND STORAGE MEDIUM

TECHNICAL FIELD

The present disclosure relates to the technical field of image processing, and in particular, to a method and system for segmenting a lung image. The present disclosure also particularly relates to a processor that performs the above method and a computer-readable storage medium that stores a computer program capable of implementing the above method.

BACKGROUND

Computed tomography (CT) is an important means for diagnosing pulmonary diseases (such as pneumonia). In the case of a large number of patients, it is necessary to improve the quality of a scan image and the scanning efficiency by using artificial intelligence technologies. One of the methods includes quickly and accurately segmenting a nidus based on a CT image. With the development of computers, a number of nidus image segmentation methods have continuously emerged, such as a bilateral threshold method, a watershed method, a level set method, and a graph cut method. In recent years, a nidus segmentation method based on deep learning has also been widely applied in the field of medical image processing. However, these methods all need improvements for CT image segmentation of some pulmonary symptoms. For example, the traditional methods are often adapted to specific data, and have a relatively low segmentation speed and insufficient segmentation accuracy, and the method based on deep learning has omission of segmentation due to insufficient amount of data.

Therefore, it is necessary to design a new method and system for segmenting a lung image, thus improving the accuracy and precision of nidus segmentation.

SUMMARY

According to a first aspect of the present disclosure, a method for segmenting a lung image is provided. The method comprises: obtaining medical image data containing a lung region; performing lung lobe segmentation on the medical image data to generate a plurality of lung lobe data subsets; generating updated lung image data based on one or a plurality of lung lobe data subsets in the plurality of lung lobe data subsets; and performing nidus segmentation on the updated lung image data to generate a segmentation image that identifies a pneumonia nidus.

According to a second aspect of the present disclosure, a system for segmenting a lung image is provided. The system comprises: an obtaining module configured to obtain medical image data containing a lung region; a lung lobe segmentation module configured to perform lung lobe segmentation on the medical image data to define a plurality of boundaries in the medical image data; a lung image updating module configured to generate updated lung image data based on image data within one or a plurality of boundaries among the plurality of boundaries of the medical image data; and a nidus segmentation module configured to perform nidus segmentation on the updated lung image data to generate a segmentation image that identifies a pneumonia nidus.

Different from existing methods and systems (which segment CT images for pneumonia niduses directly without performing lung lobe segmentation), the method and system of the present disclosure first perform lung lobe segmentation after obtaining a CT image containing a lung region, thereby obtaining a segmentation image of a region of interest. Finally, a pneumonia nidus is segmented in the region of interest, thereby obtaining a segmentation image that accurately identifies the pneumonia nidus.

Preferably, before performing lung lobe segmentation on the medical image data, the medical image data is preprocessed, wherein preprocessing the medical image data comprises at least one of: cropping the medical image data; resampling the medical image data; and denoising the medical image data.

Preferably, performing lung lobe segmentation on the medical image data comprises: performing lung lobe segmentation on the medical image data by using a deep learning network or a threshold algorithm. Preferably, performing lung lobe segmentation on the medical image data further comprises: performing a region growth algorithm on the medical image data that has undergone the lung lobe segmentation by using the deep learning network or the threshold algorithm. Preferably, performing lung lobe segmentation on the medical image data further comprises: performing a morphological closing operation on the medical image data that has undergone the region growth algorithm.

Preferably, generating the updated lung image data comprises: merging at least two lung lobe data subsets in the plurality of lung lobe data subsets or merging image data within at least two boundaries in the plurality of boundaries. Preferably, generating the updated lung image data further comprises: performing a morphological closing operation on the merged lung lobe data subset.

Preferably, the plurality of lung lobe data subsets or the image data within the plurality of boundaries comprises data subsets or image data corresponding to a right upper lobe, a right middle lobe, a right lower lobe, a left upper lobe, a left lower lobe, and an airway. Preferably, the updated lung image data is lung segmentation image data generated based on the data subsets or image data of the right upper lobe, the right middle lobe, the right lower lobe, the left upper lobe, and the left lower lobe.

Preferably, the plurality of lung lobe data subsets or the image data within the plurality of boundaries comprises a data subset or image data corresponding to blood vessels, and the updated lung image data is blood vessel segmentation image data generated based on the data subset or image data of the blood vessels.

Preferably, performing nidus segmentation on the updated lung image data comprises: performing nidus segmentation on the updated lung image data by using a deep learning segmentation method to obtain first segmentation image data; performing nidus segmentation on the updated lung image data by using a threshold algorithm to obtain second segmentation image data; and fusing the first segmentation image data and the second segmentation image data to generate fused image data. Preferably, performing nidus segmentation on the updated lung image data by using a deep learning segmentation method comprises: performing data partitioning on the updated lung image data to generate a plurality of data blocks; and performing nidus segmentation on each data block in the plurality of data blocks by using a deep learning segmentation network. Preferably, performing nidus segmentation on the updated lung image data further comprises performing a morphological operation on the fused image data, the morphological operation comprising at least one of morphological erosion and dilation operations.

According to a third aspect of the present disclosure, a system including a processor for performing the above method is provided. Preferably, the system further comprises a medical imaging system configured to perform imaging scanning to generate medical image data; a storage apparatus configured to store the medical image data; and a medical imaging workstation or a medical image cloud platform analysis system communicatively connected to the storage apparatus, wherein the processor is comprised in the medical imaging workstation or the medical image cloud platform analysis system.

According to a fourth aspect of the present disclosure, a computer-readable storage medium having a computer program stored thereon is provided, wherein the program, when executed by a processor, implements the steps of the method described above.

Other features and aspects will become clear through the following detailed description, accompanying drawings and claims.

BRIEF DESCRIPTION OF THE DRAWINGS

The present disclosure may be better understood by describing exemplary embodiments of the present disclosure with reference to accompanying drawings, in which.

DETAILED DESCRIPTION

Specific implementations of the present disclosure will be described in the following. It should be noted that during the specific description of the implementations, it is impossible to describe all features of the actual implementations in detail in this description for the sake of brief description. It should be understood that in the actual implementation of any of the implementations, as in the process of any engineering project or design project, a variety of specific decisions are often made in order to achieve the developer's specific objectives and meet system-related or business-related restrictions, which will vary from one implementation to another. Moreover, it can also be understood that although the efforts made in such development process may be complex and lengthy, for those of ordinary skill in the art related to content disclosed in the present disclosure, some changes in design, manufacturing, production or the like based on the technical content disclosed in the present disclosure are only conventional technical means, and should not be construed as that the content of the present disclosure is insufficient.

Unless otherwise defined, the technical or scientific terms used in the claims and the description are as they are usually understood by those of ordinary skill in the art to which the present disclosure pertains. The words "first," "second" and similar words used in the description and claims of the patent application of the present disclosure do not denote any order, quantity or importance, but are merely intended to distinguish between different constituents. The terms "one," "a/an," and the like do not denote a limitation of quantity, but rather denote the presence of at least one of the referenced items. The terms "include," "comprise," and the like are intended to mean that an element or article that appears before "include" or "comprise" encompasses elements or articles and equivalent elements that are listed after "include" or "comprise," and do not exclude other elements or articles. The word "connect," "connected" or a similar word is not limited to a physical or mechanical connection, and is not limited to a direct or indirect connection.

An operating environment of the present disclosure is described for an X-ray computed tomography (CT) system. Those skilled in the art will understand that the present disclosure is applicable to other radiographic imaging systems or imaging systems based on other high-frequency electromagnetic energy.

Figure 1:
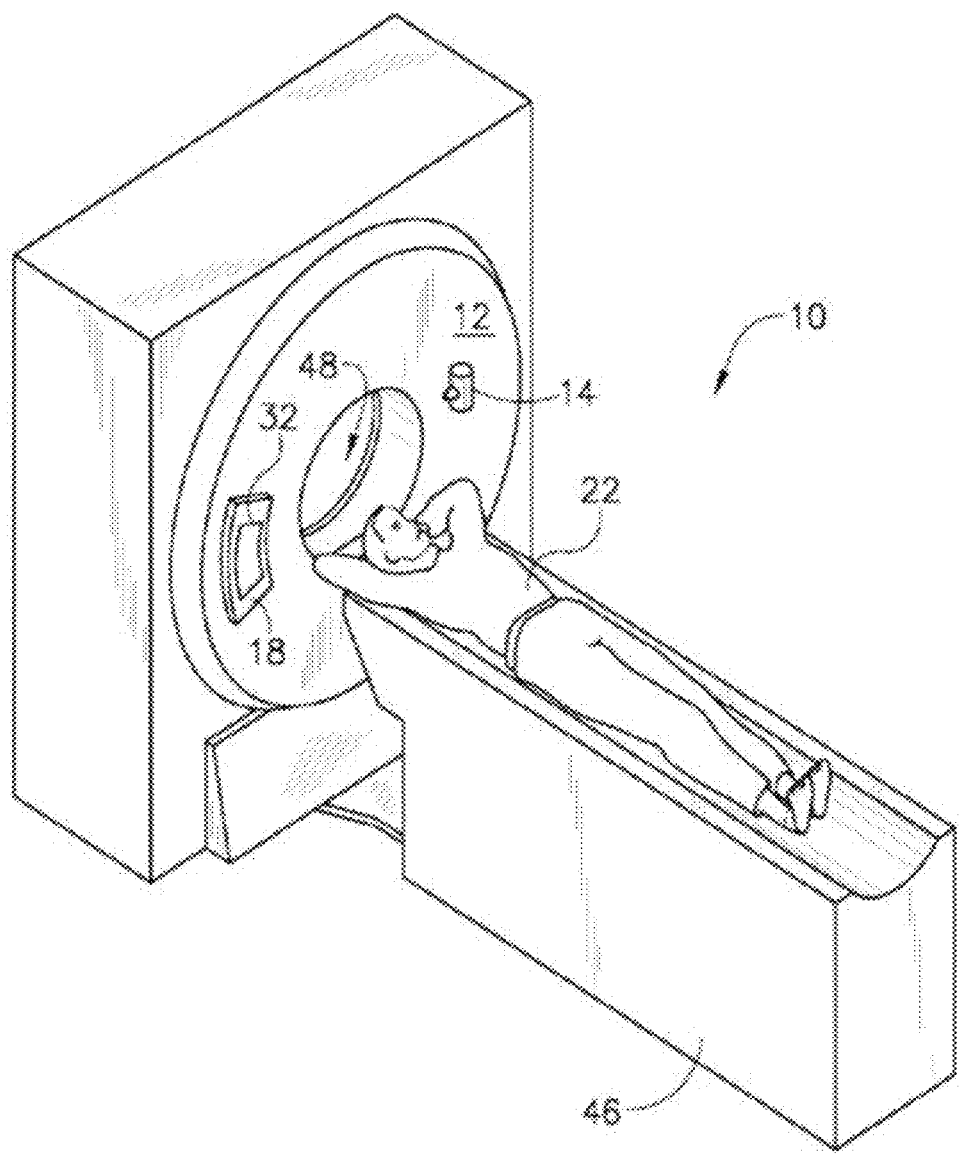
FIG. 1 shows a CT imaging system 10 to which a method according to an exemplary embodiment of the present disclosure is applicable.
Figure 2:
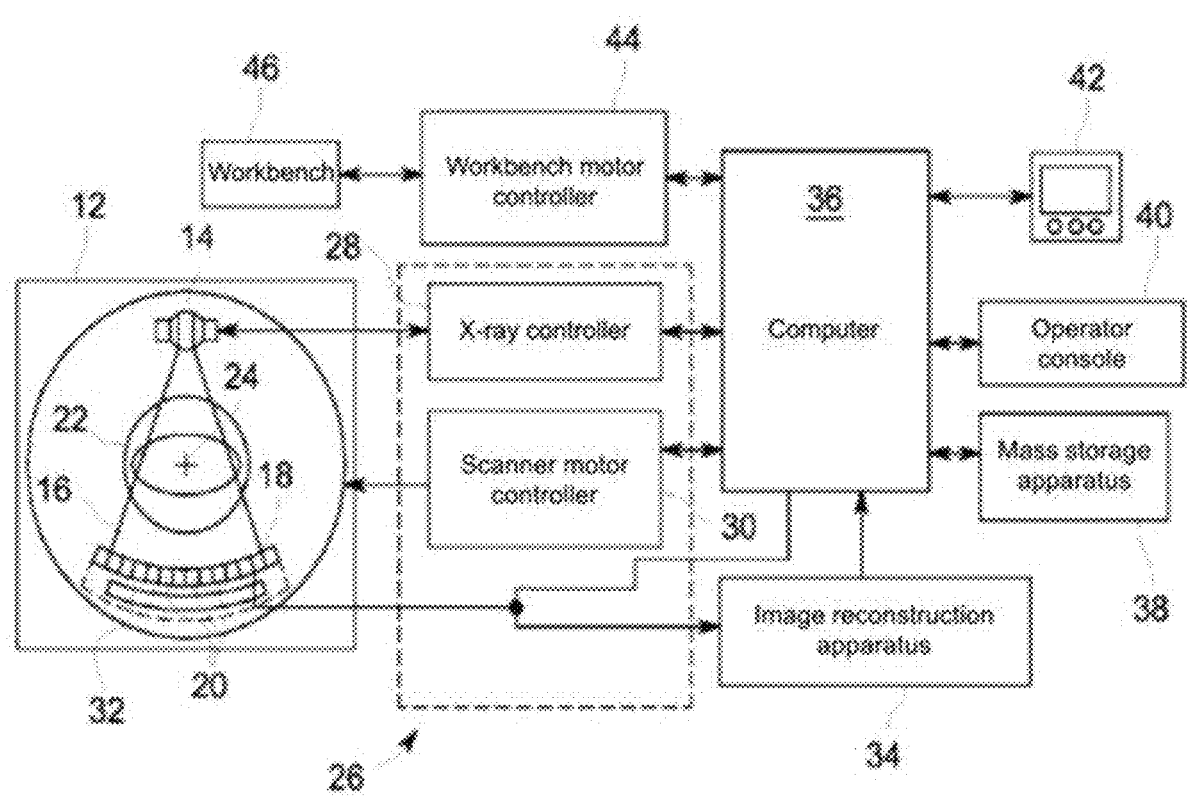
FIG. 2 is a schematic block diagram of the exemplary CT imaging system shown in FIG. 1.

FIG. 1 shows a CT imaging system 10 to which a method according to an exemplary embodiment of the present disclosure is applicable. FIG. 2 is a schematic block diagram of the example CT imaging system shown in FIG. 1.

Referring to FIG. 1, the CT imaging system 10 is shown as including a scanner 12. The scanner 12 has an X-ray source 14, and the X-ray source 14 projects an X-ray beam toward a detector assembly or collimator 18 on an opposite side of the scanner 12.

Referring to FIG. 2, the detector assembly 18 includes a plurality of detector units 20 and a data acquisition system (DAS) 32. The plurality of detector units 20 sense a projected X-ray 16 passing through an object 22.

According to the sensing of the detector units 20, the DAS 32 converts collected information into projection data for subsequent processing. During the scanning for acquiring X-ray projection data, the scanner 12 and components mounted thereon rotate around a rotation center 24.

The rotation of the scanner 12 and the operation of the X-ray source 14 are controlled by a control mechanism 26 of the CT system 10. The control mechanism 26 includes an X-ray controller 28 that provides power and a timing signal to the X-ray source 14 and a scanner motor controller 30 that controls the rotation speed and position of the scanner 12. An image reconstruction apparatus 34 receives the projection data from the DAS 32 and performs image reconstruction. A reconstructed image is transmitted as an input to a computer 36, and the computer 36 stores the image in a mass storage apparatus 38.

The computer 36 also receives commands and scan parameters from an operator through a console 40, and the console 40 has an operator interface in a certain form, such as a keyboard, a mouse, a voice activated controller, or any other suitable input apparatus. An associated display 42 allows the operator to observe the reconstructed image and other data from the computer 36. The commands and parameters provided by the operator are used by the computer 36 to provide control signals and information to the DAS 32, the X-ray controller 28, and the scanner motor controller 30. In addition, the computer 36 operates a workbench motor controller 44, which controls a workbench 46 to position the object 22 and the scanner 12. In particular, the workbench 46 moves the object 22 in whole or in part through a scanner opening 48 of FIG. 1.

Only one example of an imaging system suitable for applying the method of the present disclosure is described above. Those skilled in the art will recognize that the method of the present disclosure is also applicable to any imaging system or device based on other radioactive rays or high-frequency electromagnetic energy.

Figure 3:
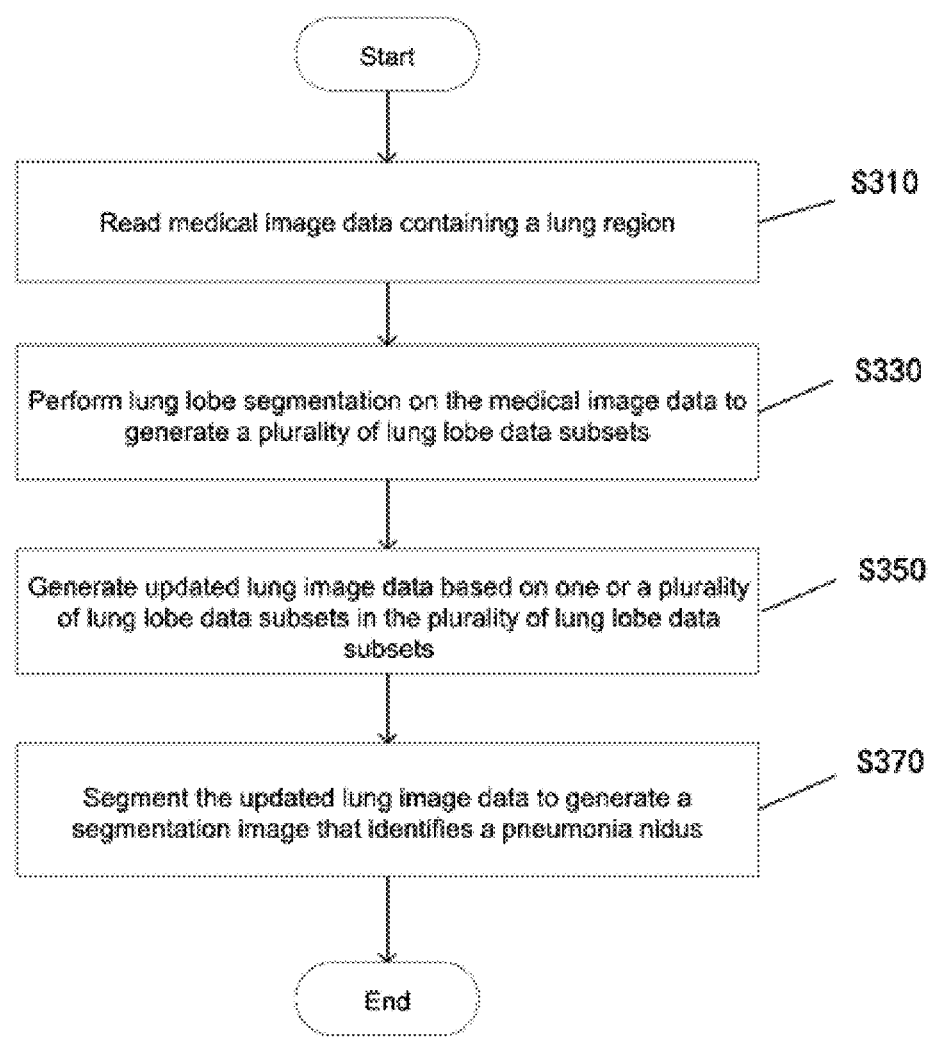
FIG. 3 is a flowchart of a method 300 for segmenting a lung image according to an exemplary embodiment of the present disclosure.

According to an embodiment of the present disclosure, a method for segmenting a lung image is provided. Referring to FIG. 3, a flowchart of a method 300 for segmenting a lung image according to an exemplary embodiment of the present disclosure is shown. In the first embodiment, for example, the method 300 is applied to the CT imaging system shown in FIG. 1. As shown in FIG. 3, the method 300 for segmenting a lung image according to the first embodiment may include the following steps S310 to S370.

In step S310, medical image data containing a lung region is obtained. The medical image data may come from an image reconstruction apparatus of an imaging device, or may be pre-stored in a memory. In some embodiments of the present disclosure, the medical image data may be medical image data obtained by scanning the body (including the chest) of an object. Alternatively, in other embodiments of the present disclosure, the medical image data may be image data obtained by performing one or a plurality of processing on original medical image data containing the chest scan. In this way, the medical image data may include image data corresponding to a lung region of the object.

In step S330, lung lobe segmentation is performed on the medical image data to generate a plurality of lung lobe data subsets.

In some embodiments of the present disclosure, the plurality of lung lobe data subsets may include data subsets corresponding to a right upper lobe R1, a right middle lobe R2, a right lower lobe R3, a left upper lobe L1, a left lower lobe L2, and an airway A. In other embodiments of the present disclosure, the plurality of lung lobe data subsets may include a data subset corresponding to blood vessels.

In some embodiments of the present disclosure, lung lobe segmentation may be performed on the medical image data by using a specific deep learning network or a threshold algorithm to obtain a plurality of initial lung lobe data subsets. The deep learning network may be a conventional neural network (CNN), a fully convolutional neural network (FCN), a deep convolutional neural network (DCNN), a Dense-VNet network, a U-net network, and so on. The threshold algorithm may be a bilateral threshold algorithm, an OStu algorithm, an adaptive threshold algorithm, and so on.

Optionally, a region growth algorithm may be performed on the medical image data that has undergone the lung lobe segmentation by using the deep learning network or the threshold algorithm. For example, seed points may be automatically selected for initial data subsets corresponding to R1, R2, R3, L1, L2, A, and/or BV, respectively, and a maximum connectivity algorithm may be used to remove separated noise points to optimize segmentation results, thereby obtaining intermediate data subsets corresponding to R1, R2, R3, L1, L2, A, and/or BV. It should be noted that the execution of the region growth algorithm is optional, not necessary. For example, the aforementioned plurality of initial lung lobe data subsets may be directly used as the result of the lung lobe segmentation, that is, the plurality of lung lobe data subsets.

Optionally, a morphological closing operation may be performed on the medical image data that has undergone the region growth algorithm. For example, the morphological closing operation may be performed on the intermediate data subsets corresponding to R1, R2, R3, L1, L2, A, and/or BV, respectively, thus obtaining final lung lobe data subset corresponding to R1, R2, R3, L1, L2, A and/or BV to serve as the result of the lung lobe segmentation. It should be noted that the morphological closing operation is optional, not necessary. For example, the aforementioned plurality of intermediate data subsets may be directly used as the result of the lung lobe segmentation, that is, the plurality of lung lobe data subsets.

Figure 4:
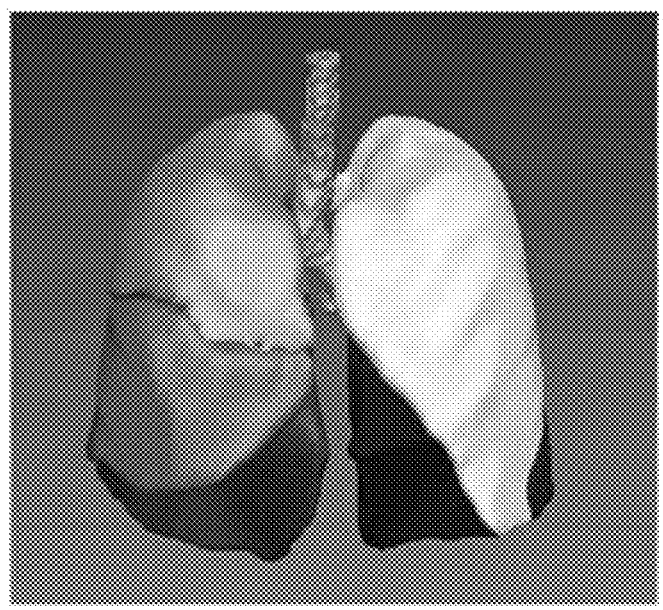
FIG. 4 shows an example of a lung lobe segmentation result obtained by the method according to the present disclosure.

Referring to FIG. 4, an example lung lobe segmentation result is shown, wherein the lung lobe segmentation result (a plurality of lung lobe data subsets) includes data subsets corresponding to R1, R2, R3, L1, L2, and A.

Referring back to FIG. 3, in step S350, updated lung image data is generated based on one or a plurality of lung lobe data subsets in the plurality of lung lobe data subsets.

In some embodiments of the present disclosure, if only one part (for example, one of R1, R2, R3, L1, L2, and BV) of the lung region in the medical image data is concerned, updated lung image data may be generated only for this part. In other words, one data subset in the plurality of lung lobe data subsets may be directly used as the updated lung image data for subsequent processing. For example, in some early stages of pneumonia, pneumonia niduses may only exist in blood vessels in lungs without spreading to lung tissues. In this case, the method of the present disclosure may be used to perform nidus segmentation only for the blood vessels, thereby obtaining a result of the nidus segmentation for the blood vessels in the lungs. Therefore, as an example, segmentation image data of the blood vessels in the lungs may be obtained only based on the lung lobe data subset BV, and then used as the above updated lung image data.

In some embodiments of the present disclosure, if a plurality of parts (for example, R1, R2, R3, L1, and L2) of the lung region in the medical image are concerned, updated lung image data may be generated for these parts. Specifically, lung lobe data subsets corresponding to a plurality of parts of interest may be merged to generate merged image data. For example, the lung lobe data subsets R1, R2, R3, L1, and L2 may be merged to obtain segmentation image data of the whole lung. Alternatively, only the lung lobe data subsets R1, R2, and R3 may be merged to obtain segmentation image data of the right lung, or only the lung lobe data subsets L1 and L2 may be merged to obtain segmentation image data of the left lung. The merging method may include, but is not limited to, an image merging operation.

Figure 5:
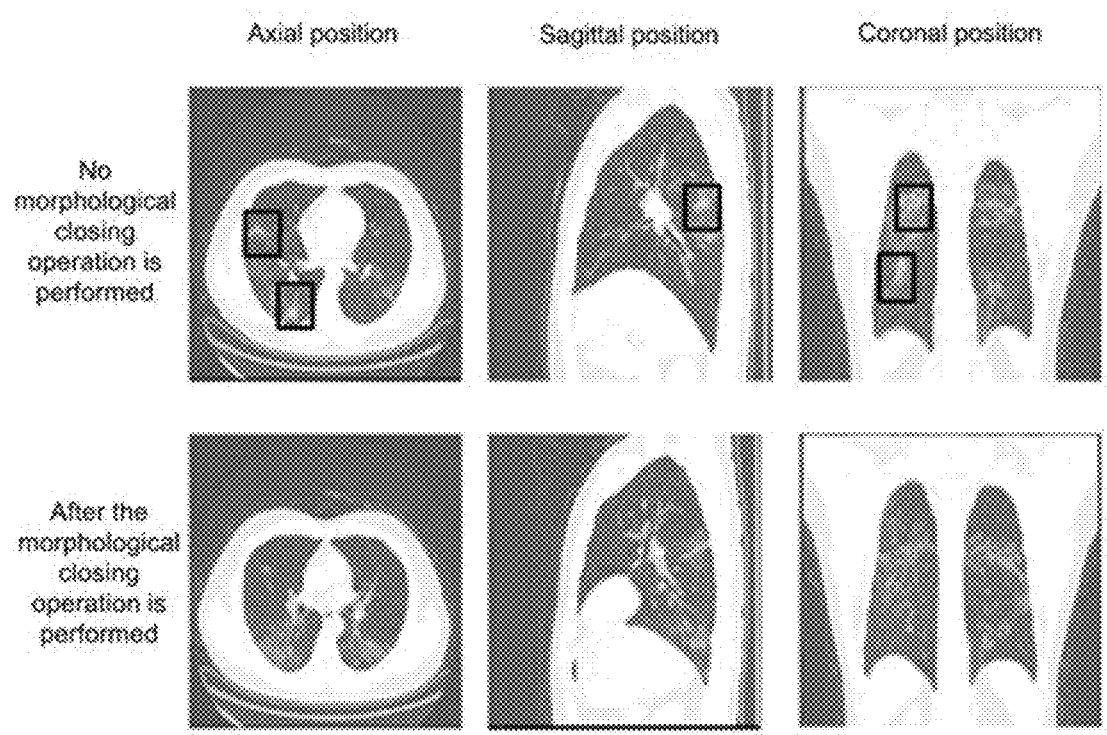
FIG. 5 is an example comparison diagram of images before and after a morphological closing operation is performed.

Optionally, a morphological closing operation may be performed on the merged image data (that is, the merged lung lobe data subset) to obtain the required segmentation result (that is, the updated lung image data). Performing the morphological closing operation on the image data can eliminate narrow discontinuities in the image and fill small holes. Referring to FIG. 5, an example comparison diagram of images before and after the morphological closing operation is performed is shown. In a region indicated by a block in FIG. 5, the integrity/continuity of the image after the morphological closing operation is performed is improved.

Referring back to FIG. 3, in step S370, nidus segmentation is performed on the updated lung image data to generate a segmentation image that identifies the pneumonia nidus.

The method for segmenting a lung image according to an exemplary embodiment of the present disclosure is described above. Different from the existing method (in which nidus segmentation is performed directly on a medical image without performing lung lobe segmentation), the method of the present disclosure first performs lung lobe segmentation after obtaining medical image data containing a lung region, thus obtaining a segmentation image of a region of interest. Finally, the pneumonia nidus is segmented in the region of interest, thereby obtaining a segmentation image of the pneumonia nidus. The method of the present disclosure is particularly suitable for solving the problem of precise segmentation of some pneumonia niduses, and is of great significance in subsequent precise quantitative analysis of some niduses. However, those skilled in the art can realize that the method of the present disclosure is not only suitable for segmentation of some pneumonia niduses, but also suitable for region segmentation of other viral pneumonia, bacterial pneumonia, and non-pulmonary inflammation.

Figure 6:
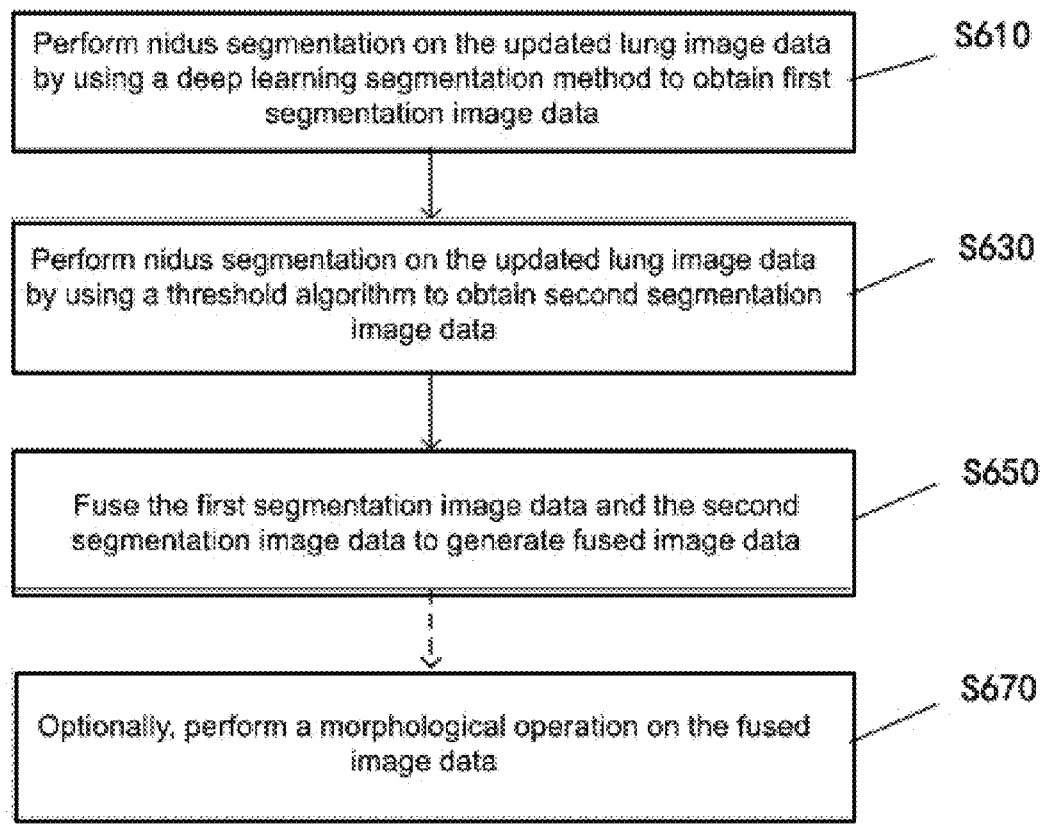
FIG. 6 is a flowchart of a pneumonia nidus segmentation step according to an exemplary embodiment of the present disclosure.

In an optional implementation of the present disclosure, step S370 may further include the following sub-steps S610 to S670, as shown in FIG. 6. In sub-step S610, nidus segmentation may be performed on the updated lung image data by using a deep learning segmentation method to obtain first segmentation image data based on the deep learning.

In some embodiments of the present disclosure, optionally, a three-dimensional bounding box surrounding the lung region may be defined in the updated lung image data first. For example, the three-dimensional bounding box may be the smallest cubic bounding box surrounding the lung region. Then, data partitioning may be performed on image data in the three-dimensional bounding box to generate a plurality of data blocks. The plurality of data blocks may each have a predetermined size. For example, assuming that the size of a data matrix of the three-dimensional bounding box surrounding the lung region is 128*128*128, it can be slidingly cropped into 8 data blocks in a size of 64*64*64. It should be noted that it is not intended to limit the size and quantity of data blocks in the present disclosure, as long as the size of the data block can meet input requirements of a deep learning network used during a subsequent segmentation step. For example, the size of the data block may be set according to a graphic memory of an actual GPU and the complexity of the deep learning network. In addition, if the size of the data matrix of the three-dimensional bounding box cannot be evenly divided by the predetermined size of the data block, it is automatically completed in a manner of maximizing the quantity of data blocks. In order to simplify the description, a two-dimensional image is taken as an example. Assuming that the size of an original image is 574 (H)×437 (W), and 100*100 is used for cropping, then according to the maximum segmentation, it will be cropped into 6*5, i.e., 30 pieces in total. That is, the quantity=(round down H/100 to an integer+1)×(round down W/100 to an integer+1). In other words, even if the H of the original image is 501, the original image must be cut into 6 segments in the H direction (round down 501/100 to the integer 5 and then +1).

Then, nidus segmentation is performed on each data block in the plurality of data blocks by using the deep learning segmentation network to obtain a plurality of corresponding segmentation results. For example, each data block may be input into the deep learning network to perform segmentation for a pneumonia nidus, so as to obtain a segmentation result of each data block. The deep learning network may be a conventional neural network (CNN), a fully convolutional neural network (FCN), a deep convolutional neural network (DCNN), a Dense-VNet network, a U-net network, and so on. Subsequently, the plurality of corresponding segmentation results may be spliced. For example, the segmentation results of various data blocks may be spliced together to obtain segmentation image data based on deep learning (i.e., the first segmentation image data). It should be noted that the above data partitioning process is optional, not necessary. For example, deep learning-based nidus segmentation may be directly performed on the updated lung image data.

Figure 7:
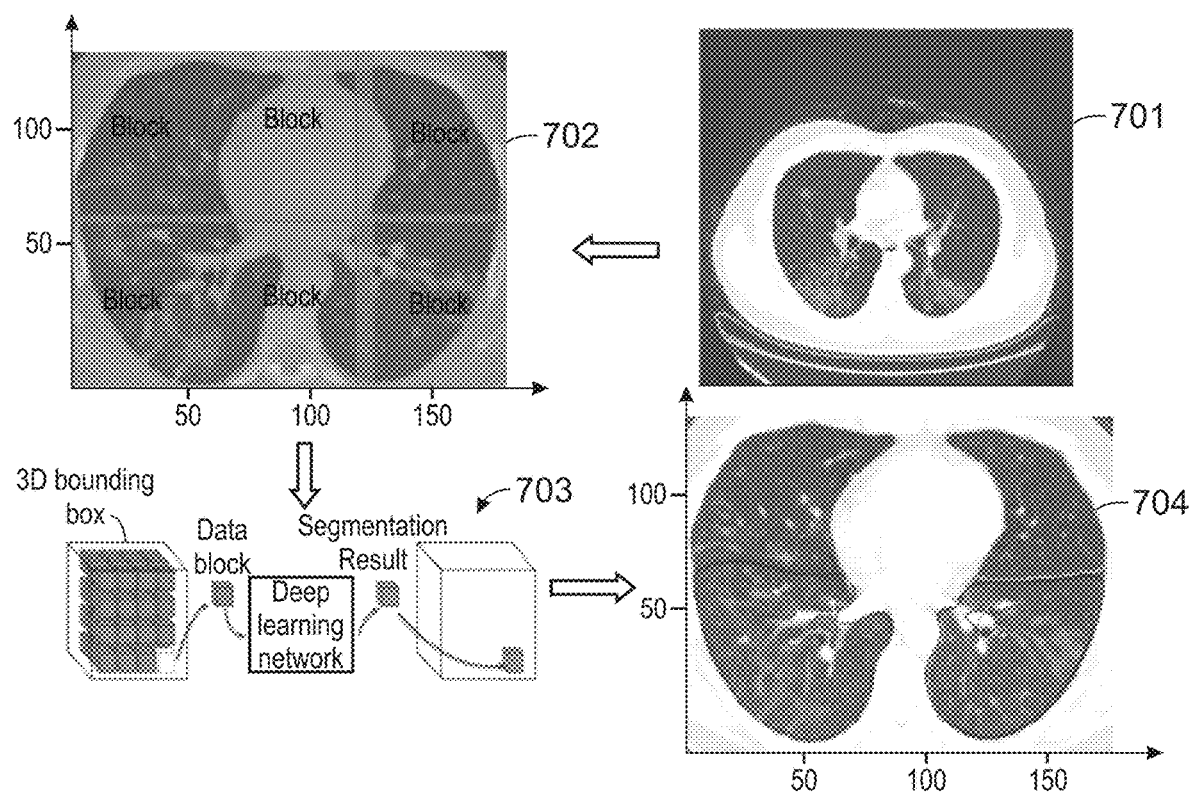
FIG. 7 is a schematic diagram of a pneumonia nidus segmentation process according to an exemplary embodiment of the present disclosure.

FIG. 7 is a schematic diagram of performing nidus segmentation on updated lung image data by using a deep learning segmentation method. As described above, firstly, a three-dimensional bounding box surrounding the lung region is defined in the updated lung image data, and then data partitioning is performed on image data in the three-dimensional bounding box to generate a plurality of data blocks. Each data block is input to a deep learning network (especially a segmentation model based on a convolutional network), and the deep learning network then outputs a segmentation result of each data block. The segmentation results of the various data blocks are re-spliced together according to an original order of the data blocks, so as to obtain the segmentation result of the updated lung image data based on deep learning. FIG. 7 shows updated lung image data 701, partitioned lung image data 702, a partitioning process 703, and a segmentation result 704, wherein a region enclosed by an irregular solid line in the segmentation result 704 is a segmentation image of the nidus.

Referring again to FIG. 6, in sub-step S630, the updated lung image data may be segmented by using a threshold algorithm to obtain second segmentation image data. In some embodiments of the present disclosure, a bilateral threshold method may be used to distinguish the pneumonia nidus from a normal lung tissue in the updated lung image data. For example, the pneumonia nidus may be extracted from the surrounding lung tissue by using threshold segmentation, so as to obtain segmentation image data based on the threshold method (i.e., the second segmentation image data). It should be noted that the threshold algorithm is not limited to a specific algorithm, and may also be an OStu algorithm, an adaptive threshold algorithm, and the like.

In sub-step S650, the first segmentation image data and the second segmentation image data may be fused to generate fused image data. In some embodiments of the present disclosure, the fusion may be realized by performing a merging operation on the first segmentation image data and the second segmentation image data.

In an optional sub-step S670, a morphological operation may be further performed on the fused image data. Optionally, in some embodiments of the present disclosure, the morphological operation performed on the fused image data may include at least one of morphological erosion and dilation operations, so that the segmentation image of the pneumonia nidus does not include a nidus with a diameter less than a predetermined threshold.

For example, the morphological erosion operation may be used to eliminate niduses having a diameter less than 5 mm. This is because some organs having a diameter less than 5 mm may be mistakenly segmented as niduses, and a clinician may be less concerned about relatively small niduses when viewing images of pneumonia niduses.

Figure 8:
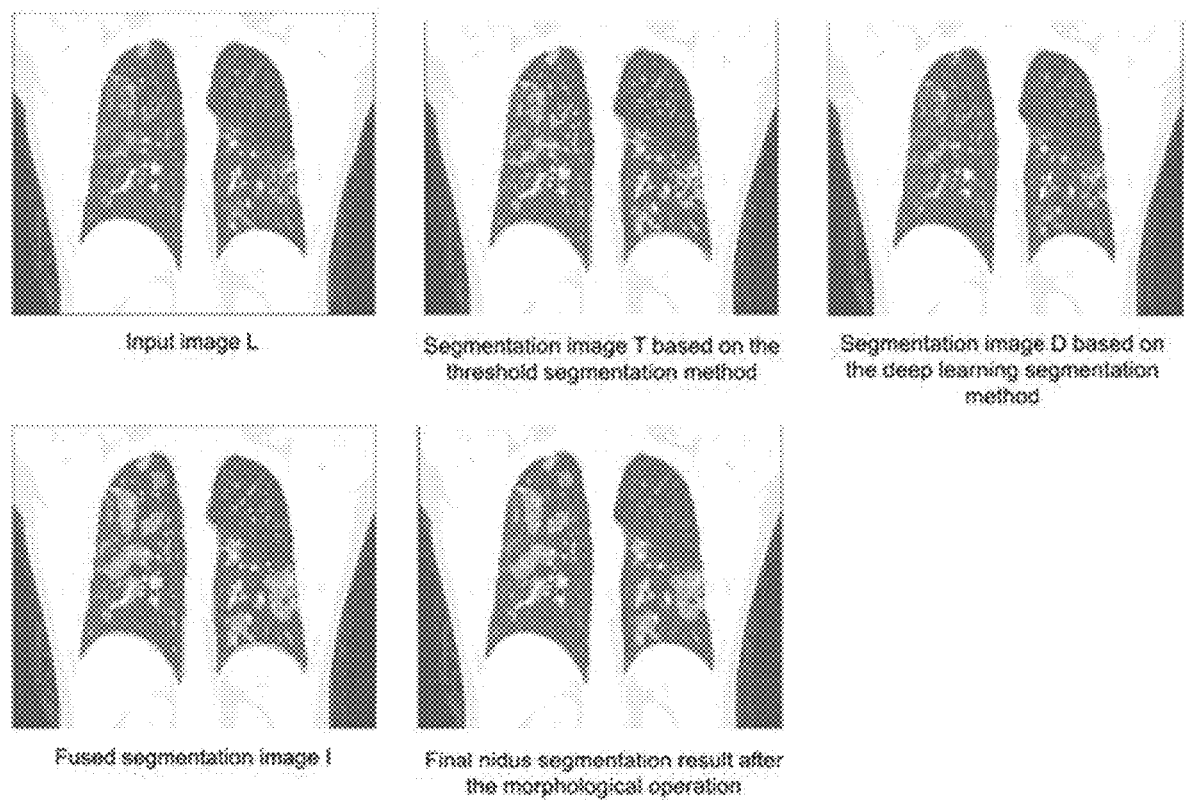
FIG. 8 shows example effect diagrams of segmentation results using a deep learning segmentation method, a threshold segmentation method, and a morphological operation respectively in the pneumonia nidus segmentation process.

FIG. 8 shows example effect diagrams of using a deep learning segmentation method, a threshold segmentation method, and a morphological operation respectively in a process of pneumonia nidus segmentation. In an input image (corresponding to the updated lung image data) L, a deep learning network (for example, a segmentation model based on a neural network) and a threshold segmentation algorithm are adopted respectively to segment the pneumonia niduses, thereby obtaining a segmentation image D based on the deep learning segmentation method and a segmentation image T based on the threshold segmentation method. As shown in the drawing, in the segmentation image D, part of the niduses in the block are not segmented, but this part of the niduses is segmented in the segmentation image T. An image merging operation is performed on the segmentation image D based on the deep learning segmentation method and the segmentation image T based on the threshold segmentation method to obtain a fused image I. In this way, in the fused segmentation image I, the niduses identified based on the deep learning segmentation method and the niduses identified based on the threshold method are all identified. Finally, a morphological operation (for example, morphological erosion and dilation operations) may be optionally performed on the fused image I to obtain the final nidus segmentation result.

By means of the above combined process, after pre-segmentation is performed on the medical image data containing the lung region, the pneumonia niduses are segmented by using the deep learning segmentation method and the threshold segmentation method respectively, and the segmentation results obtained by the two segmentation methods are fused. Optionally, the fused segmentation result is optimized by using the morphological operation to obtain a segmentation image of the pneumonia niduses. The segmentation image obtained through the above combined process presents better effects than the segmentation image obtained through a single segmentation method.

The segmentation method based on deep learning has advantages in the segmentation of niduses with large areas, while pneumonia niduses (especially some pneumonia niduses) are mostly diffuse and have a large range, so the advantages of the segmentation based on deep learning can be reflected. However, the segmentation method based on the deep learning has poor segmentation efficiency for small niduses, and may have omission of segmentation (for example, in a region shown by a block in an image D of FIG. 8, some niduses have not been identified/segmented). In the threshold segmentation method, if a threshold range is increased, the sensitivity to the nidus can be improved. However, the threshold segmentation method has more false positives, and tissues such as pulmonary blood vessels will be mistakenly segmented as niduses. The above optional implementations can greatly improve the sensitivity and precision of segmentation of pneumonia niduses by combining the two segmentation methods, and the morphological operation is used in combination to remove some irrelevant (or uninterested) tissues, thereby further improving the accuracy of pneumonia nidus segmentation.

Optionally, in some embodiments of the present disclosure, in order to further improve the accuracy of pneumonia nidus segmentation and improve the three-dimensional visualization effect of pneumonia nidus segmentation, the medical image data may be preprocessed before the lung lobe segmentation is performed on the medical image data. The preprocessing the medical image data may include image cropping, image sampling, and/or image denoising.

In some embodiments of the present disclosure, whether to perform image cropping may be determined by judging whether the medical image data only includes chest scan image data. For example, if in addition to the lung region, the medical image further includes other body parts or a background (such as a part of the scanner), the medical image data may be cropped to remove at least a part of image data of the body region or the background in the medical image except for the lung region. In an image sampling process, the medical image data may be resampled to redefine a pixel pitch thereof. In addition, linear interpolation may be applied to original medical image data or cropped medical image data so that image voxels have a desired size, for example, 1*1*1. In addition, the original medical image data or the cropped/resampled image may be denoised (for example, via a Gaussian filter, a total variation filter, a median filter, deep learning, etc.) to smooth the noise of the image. It should be noted that those skilled in the art can understand that the preprocessing does not require all the above operations to be performed on the medical image data, but one or a plurality of the operations may be performed. In addition, those skilled in the art may also perform other preprocessing operations as needed.

Figure 9:
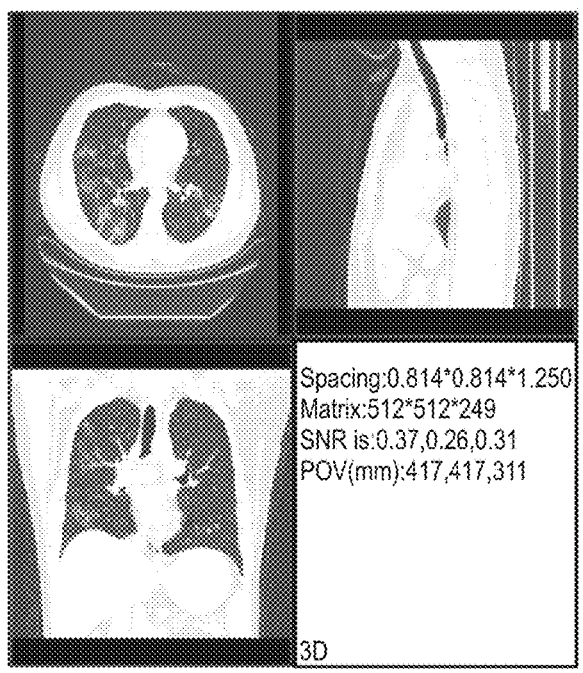
FIG. 9 and FIG. 10 respectively show examples of original CT image and preprocessed CT image.
Figure 10:
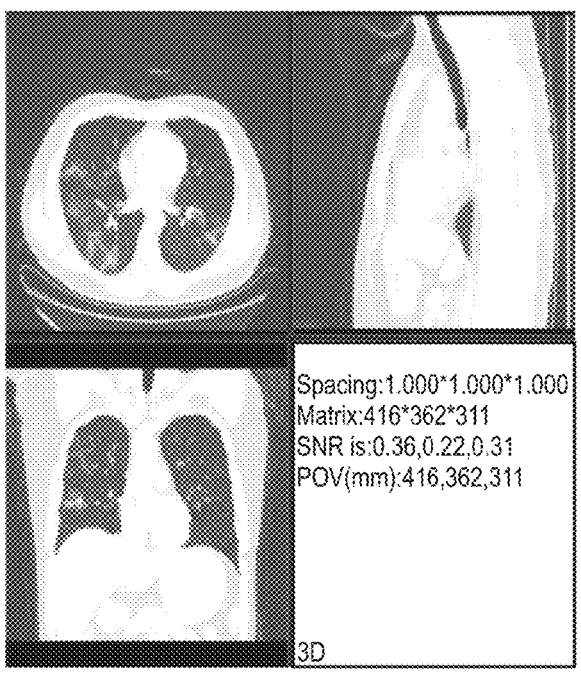

FIG. 9 and FIG. 10 show examples of original medical images and preprocessed medical images, respectively. As shown in the drawings, after the original medical image data is preprocessed (including image cropping, image sampling, and image denoising), the image data size is cropped from 512*512*249 to 416*362*311, the pixel pitch of the image is resampled from 0.814*0.814*1.25 to 1*1*1, and the signal-to-noise ratio of the image is reduced from 0.37/0.26/0.31 to 0.36/0.22/0.31.

Similar to the above method, a corresponding system is further provided in the present disclosure.

Figure 11:
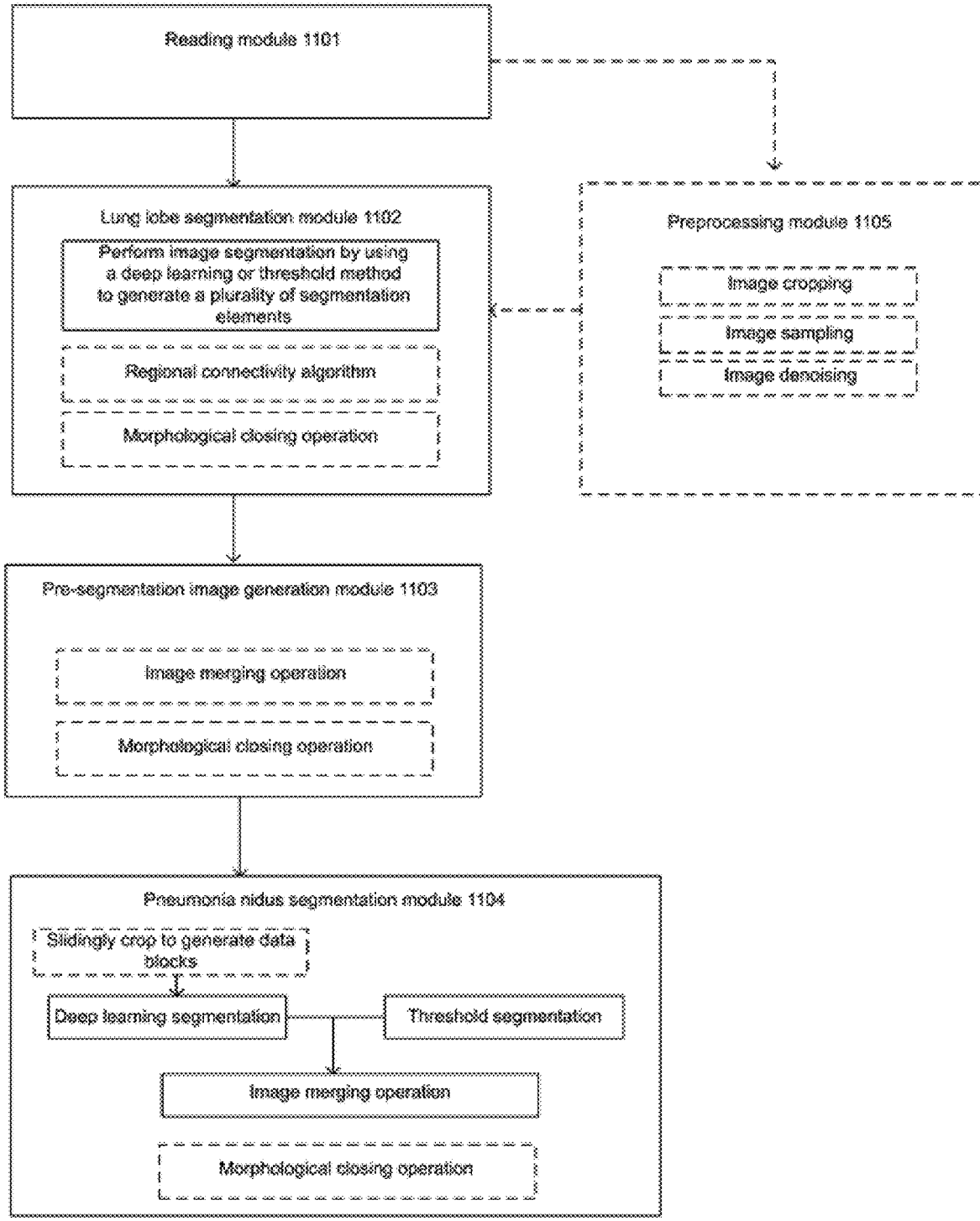
FIG. 11 and FIG. 12 are schematic block diagrams of systems 1000A and 1000B for segmenting a lung image according to an exemplary embodiment of the present disclosure.

FIG. 11 is a schematic block diagram of a system 1100 for segmenting a lung image according to an exemplary embodiment of the present disclosure. Referring to FIG. 11, the system 1100 for segmenting a lung image may include: an obtaining module 1101 configured to obtain medical image data containing a lung region; a lung lobe segmentation module 1102 configured to perform lung lobe segmentation on the medical image data to define a plurality of boundaries in the medical image data; a lung image updating module 1103 configured to generate updated lung image data based on image data within one or a plurality of boundaries among the plurality of boundaries of the medical image data; and a nidus segmentation module 1104 configured to perform nidus segmentation on the updated lung image data to generate a segmentation image that identifies the pneumonia nidus.

The image data within the plurality of boundaries may include image data corresponding to a right upper lobe R1, a right middle lobe R2, a right lower lobe R3, a left upper lobe L1, a left lower lobe L2, and an airway. Alternatively, the image data within the plurality of boundaries may include image data corresponding to blood vessels.

In some embodiments of the present disclosure, if only one part (for example, one of R1, R2, R3, L1, L2, and BV) of the lung region in the medical image data is concerned, updated lung image data may be generated only for this part. In other words, the image data within one boundary in the plurality of boundaries may be directly used as the updated lung image data for subsequent processing. As an example, the segmentation image data of the lung blood vessels may be obtained based only on the image data within the boundaries of the blood vessels BV, so as to be served as the above updated lung image data.

In some embodiments of the present disclosure, if a plurality of parts (for example, R1, R2, R3, L1, and L2) of the lung region in the medical image are concerned, updated lung image data may be generated for these parts. Specifically, the image data within the boundaries corresponding to the plurality of parts of interest may be merged to generate merged image data. For example, image data within the boundaries of lung lobes R1, R2, R3, L1, and L2 may be merged to obtain segmentation image data of the whole lung. Alternatively, only the image data within the boundaries of the lung lobes R1, R2, and R3 may be merged to obtain segmentation image data of the right lung, or only the image data within the boundaries of the lung lobes L1 and L2 may be merged to obtain segmentation image data of the left lung. The merging method may include, but is not limited to, an image merging operation.

In some embodiments of the present disclosure, the system 1100 may further include a preprocessing module 1105 (which is optional and therefore shown as a dashed block in FIG. 11) configured to perform at least one of the following operations on the obtained medical image data: cropping the medical image data; resampling the medical image data; and denoising the medical image data.

In some embodiments of the present disclosure, the lung lobe segmentation module 1102 may also be configured to perform lung lobe segmentation on the medical image data by using a deep learning network or a threshold algorithm; perform a region growth algorithm on the medical image data that has undergone the lung lobe segmentation by using the deep learning network or the threshold algorithm; and/or perform a morphological closing operation on the medical image data that has undergone the region growth algorithm.

In some embodiments of the present disclosure, the updated lung image data generation module 1103 is also configured to merge image data within at least two boundaries in the plurality of boundaries.

In some embodiments of the present disclosure, the pneumonia nidus segmentation module 1104 is further configured to perform nidus segmentation on the updated lung image data by using a deep learning segmentation method to obtain first segmentation image data; perform nidus segmentation on the updated lung image data by using a threshold algorithm to obtain second segmentation image data; fuse the first segmentation image data and the second segmentation image data to generate fused image data; and/or perform a morphological operation on the fused image data.

The system 1100 for segmenting a lung image according to an exemplary embodiment of the present disclosure is described above with reference to FIG. 11. By means of the system, after the medical image data containing the lung region is obtained, the lung lobe segmentation is performed first to obtain the segmentation image of the region of interest, and finally the pneumonia nidus is segmented in the region of interest, thereby obtaining the segmentation image of the pneumonia nidus. The system of the present disclosure is particularly suitable for solving the problem of precise segmentation of some pneumonia niduses, and is of great significance in subsequent precise quantitative analysis of some pneumonia. However, those skilled in the art can realize that the system of the present disclosure is not only suitable for segmentation of some pneumonia niduses, but also suitable for region segmentation of other viral pneumonia, bacterial pneumonia, and non-pulmonary inflammation. Furthermore, the system 1100 may also greatly improve the sensitivity and precision of pneumonia nidus segmentation by combining the two segmentation methods (the deep learning segmentation method and the threshold segmentation method), and optionally, the morphological operation is used in combination to remove some irrelevant (or uninterested) tissues, thereby further improving the accuracy of pneumonia nidus segmentation.

Figure 12:
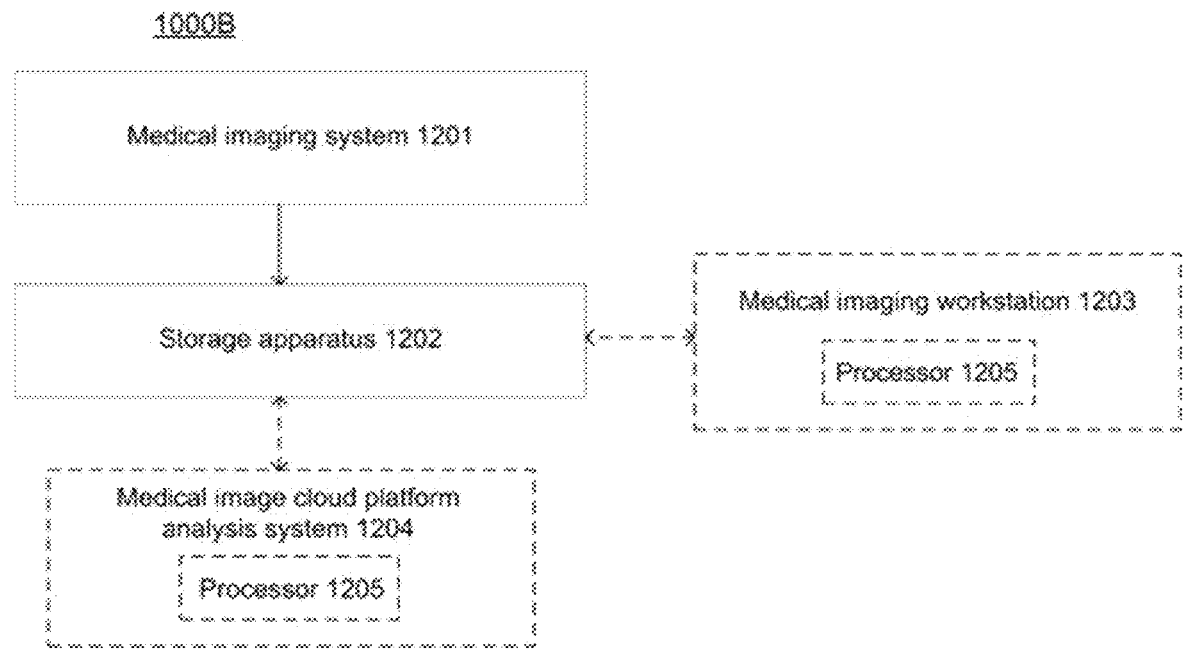

FIG. 12 is a schematic block diagram of a system 1200 according to another exemplary embodiment of the present disclosure. Referring to FIG. 12, the system 1200 for segmenting a lung image may include a medical imaging system 1201 configured to perform imaging scanning to generate medical image data, a storage apparatus 1202 configured to store the medical image data, and a medical imaging workstation 1203 or a medical image cloud platform analysis system 1204 communicatively connected to the storage apparatus 1202. A processor 1205 may be included in the medical imaging workstation 1203 or the medical image cloud platform analysis system 1204, and configured to perform the method for segmenting a lung image described in the present disclosure.

The medical imaging system 1201 for the medical image data may be a CT imaging system as described with respect to FIG. 1 and FIG. 2, or may be an imaging system or device based on other radioactive rays or high-frequency electromagnetic energy. The storage apparatus 1202 may be a storage apparatus in the medical imaging system 1201, a server external to the medical imaging system 1201, an independent medical image storage system (such as a PACS), or a remote cloud storage system. The medical imaging workstation 1203 may be arranged locally in the medical imaging system 1201, and the medical image cloud platform analysis system 1204 may be located away from the medical imaging system 1201, for example, arranged at the cloud in communication with the medical imaging system 1201. As an example, after a medical institution completes an imaging scan using the medical imaging system 1201, data obtained by the scanning is stored in the storage apparatus 1202. The medical imaging workstation 1203 may directly obtain the data obtained by the scanning, and perform subsequent analysis by using the method of the present disclosure through its processor. As another example, the medical image cloud platform analysis system 1204 may obtain the medical image data in the storage apparatus 1202 through remote communication to provide "software as a service (SAAS)". The SAAS may exist between hospitals, between a hospital and an imaging center, or between a hospital and a third-party online diagnosis and treatment service platform.

Figure 13:
FIG. 13 shows an example of a 3D view generated according to a segmentation image obtained by segmenting a CT image using the method and system of the present disclosure.

Referring to FIG. 13, an example of a 3D view generated from a segmentation image obtained by segmenting the medical image data using the method and system of the present disclosure is shown. In this example, the lung lobe data subsets or image data on which the updated lung image data is based is data subsets or image data corresponding to the right upper lobe R1, the right middle lobe R2, the right lower lobe R3, the left upper lobe L1, and the left lower lobe L2. Therefore, in the resulting segmentation image, the pneumonia niduses in the upper right lobe R1, the right middle lobe R2, the right lower lobe R3, the left upper lobe L1, and the left lower lobe L2 are identified, that is, they are differentiated from the non-pneumonia nidus regions.

One or a plurality of the above-described techniques and/or embodiments may be implemented using hardware and/or software or include hardware and/or software, for example, modules or apparatuses executed on one or a plurality of computing devices (for example, the computer 36). Of course, the modules or apparatuses described herein show various functions and are not limited to limiting the structure and functions of any embodiment. On the contrary, the functions of various modules or apparatuses may be divided and executed differently according to more or fewer modules or apparatuses considered by various designs.

Figure 14:
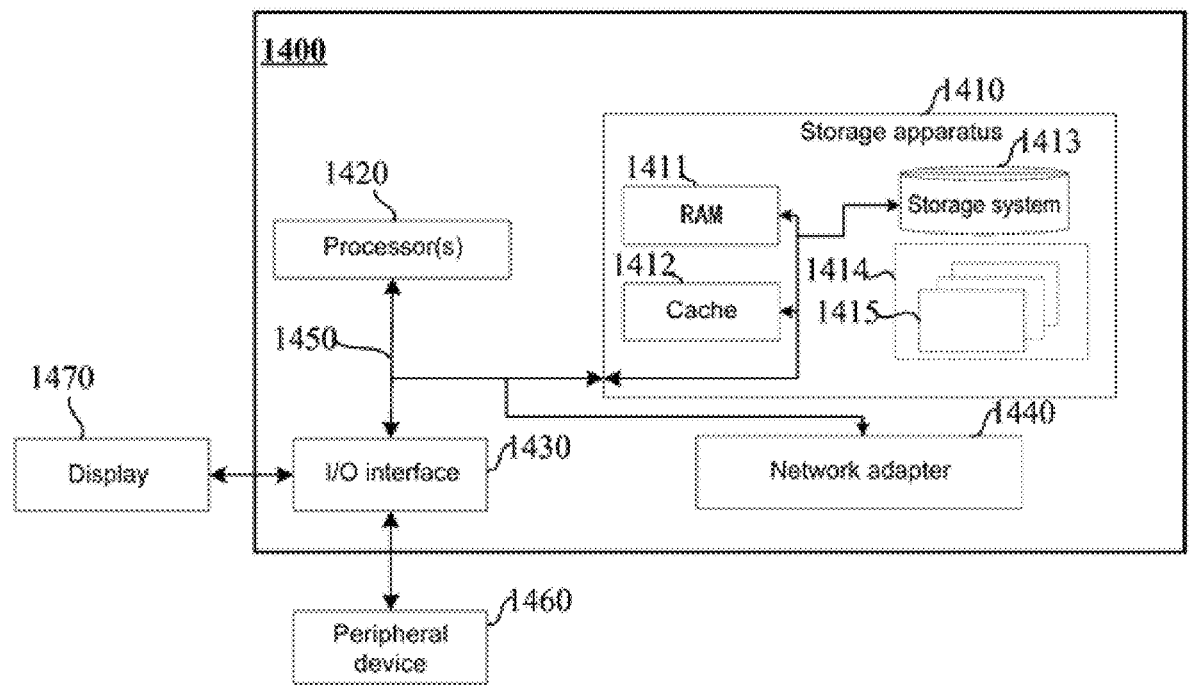
FIG. 14 shows an example of an electronic device 1200 according to an embodiment of the present disclosure.

FIG. 14 shows an example of an electronic device 1400 according to an embodiment of the present disclosure. The electronic device 1400 includes: one or a plurality of processors 1420; a storage apparatus 1410 configured to store one or a plurality of programs, and when the one or a plurality of programs are executed by the one or a plurality of processors 1420, the one or a plurality of processors 1420 are caused to implement the segmentation method provided in the embodiment of the present disclosure. The processor is, for example, a digital signal processor (DSP), a microcontroller, an application-specific integrated circuit (ASIC), or a microprocessor.

The electronic device 1400 shown in FIG. 14 is only an example, and should not bring any limitation to the function and application scope of the embodiment of the present disclosure.

As shown in FIG. 14, the electronic device 1400 is represented in the form of a general-purpose computing device. Components of the electronic device 1400 may include, but are not limited to: one or a plurality of processors 1420, a storage apparatus 1410, and a bus 1450 connecting different system components (including the storage apparatus 1410 and the processor 1420).

The bus 1450 indicates one or a plurality of types among several types of bus structures, including a memory bus or a memory controller, a peripheral bus, a graphics acceleration port, a processor, or a local bus using any bus structure of the plurality of bus structures. For example, these architectures include, but are not limited to, an industry standard architecture (ISA) bus, a microchannel architecture (MAC) bus, an enhanced ISA bus, a video electronics standards association (VESA) local bus, and a peripheral component interconnection (PCI) bus.

The electronic device 1400 typically includes a variety of computer system readable media. These media may be any available media that can be accessed by the electronic device 1400, including volatile and non-volatile media, removable and non-removable media.

The storage apparatus 1410 may include a computer system readable medium in the form of a volatile memory, for example, a random access memory (RAM) 1411 and/or a cache memory 1412. The electronic device 1400 may further include other removable/non-removable, volatile/non-volatile computer system storage media. For example only, the storage system 1413 may be configured to read and write a non-removable non-volatile magnetic medium (which is not shown in FIG. 14, and is generally referred to as a "hard drive"). Although not shown in FIG. 14, a magnetic disk drive for reading and writing a removable non-volatile magnetic disk (such as a "floppy disk") and an optical disc drive for reading and writing a removable non-volatile optical disc (such as a CD-ROM, a DVD-ROM, or other optical media) may be provided. In these cases, each drive may be connected to the bus 1450 through one or a plurality of data medium interfaces. The storage apparatus 1410 may include at least one program product, the program product has a group (for example, at least one) of program modules, and these program modules are configured to perform the functions of the various embodiments in the present disclosure.

A program/utility tool 1414 having a group (at least one) of program modules 1415 may be stored in, for example, the storage apparatus 1410. Such program module 1415 includes but is not limited to an operating system, one or a plurality of application programs, other program modules, and program data, each of these examples or a certain combination thereof may include implementation of a network environment. The program module 1415 generally performs the functions and/or methods in any embodiment described in the present disclosure.

The electronic device 1400 may also communicate with one or a plurality of peripheral devices 1460 (such as a keyboard, a pointing device, and a display 1470), and may also communicate with one or a plurality of devices that enable a user to interact with the electronic device 1400, and/or communicate with any device (such as a network card and a modem) that enables the electronic device 1400 to communicate with one or a plurality of other computing devices. This communication may be performed through an input/output (I/O) interface 1430. In addition, the electronic device 1400 may also communicate with one or a plurality of networks (for example, a local area network (LAN), a wide area network (WAN), and/or a public network, such as the Internet) through a network adapter 1440. As shown in FIG. 14, the network adapter 1440 communicates with other modules of the electronic device 1400 through the bus 1450. It should be understood that although not shown in the drawing, other hardware and/or software modules, including but not limited to: microcode, device drivers, redundant processing units, external disk drive arrays, RAID systems, tape drives, data backup storage system, and the like may be used in conjunction with the electronic device 1400.

The processor 1420 executes various functional applications and data processing by running programs stored in the storage apparatus 1410, such as implementing a method for segmenting a lung image provided by an embodiment of the present disclosure.

The technique described herein may be implemented with hardware, software, firmware, or any combination thereof, unless specifically described as being implemented in a specific manner. Any features described as modules or components may also be implemented together in an integrated logical apparatus, or separately implemented as discrete but interoperable logical apparatuses. If implemented with software, the technique may be implemented at least in part by a non-transitory processor-readable storage medium that includes instructions, where when executed, the instructions perform one or more of the aforementioned methods. The non-transitory processor-readable data storage medium may form part of a computer program product that may include an encapsulation material. Program code may be implemented in a high-level procedural programming language or an object-oriented programming language so as to communicate with a processing system. If desired, the program code may also be implemented in an assembly language or a machine language. In fact, the mechanisms described herein are not limited to the scope of any particular programming language. In any case, the language may be a compiled language or an interpreted language.

One or a plurality of aspects of at least some embodiments may be implemented by representative instructions stored on a machine-readable medium and representing various logics in the processor. The representative instructions, when obtained by a machine, cause the machine to manufacture logics for executing the technology described herein.

Such computer-readable storage medium may include, but is not limited to, a non-transitory, tangible arrangement of an article manufactured or formed by a machine or apparatus, including a storage medium such as a hard disk; any other type of disk including a floppy disk, an optical disc, a compact disk read-only memory (CD-ROM), a compact disk rewritable (CD-RW), and a magneto-optical disk; a semiconductor device such as a read-only memory (ROM), a random access memory (RAM) such as a dynamic random access memory (DRAM) and a static random access memory (SRAM), an erasable programmable read-only memory (EPROM), a flash memory, and an electrically erasable programmable read-only memory (EEPROM); a phase change memory (PCM); a magnetic or optical card; or any other type of medium suitable for storing electronic instructions.

Instructions may further be sent or received via a network interface device that uses any of a number of transport protocols (for example, Frame Relay, Internet Protocol (IP), Transfer Control Protocol (TCP), User Datagram Protocol (UDP), and Hypertext Transfer Protocol (HTTP)) and through a communication network using a transmission medium.

An exemplary communication network may include a local area network (LAN), a wide area network (WAN), a packet data network (for example, the Internet), a mobile phone network (for example, a cellular network), a plain old telephone service (POTS) network, and a wireless data network (for example, Institute of Electrical and Electronics Engineers (IEEE) 802.11 standards referred to as Wi-Fi®, and IEEE 802.16 standards referred to as WiMax®), IEEE 802.15.4 standards, a peer-to-peer (P2P) network, and the like. In an example, the network interface device may include one or a plurality of physical jacks (for example, Ethernet, coaxial, or phone jacks) or one or a plurality of antennas for connection to the communication network. In an example, the network interface device may include a plurality of antennas that wirelessly communicate using at least one technique of single-input multiple-output (SIMO), multiple-input multiple-output (MIMO), or multiple-input single-output (MISO) techniques.

The term "transmission medium" should be considered to include any intangible medium capable of storing, encoding, or carrying instructions for execution by a machine, and the "transmission medium" includes digital or analog communication signals or any other intangible medium for facilitating communication of such software.

So far, the method and system for segmenting a lung image according to the present disclosure have been described, and the computer-readable storage medium capable of implementing the method has also been introduced.

By means of the present disclosure, lung lobe segmentation may be first performed after the medical image data containing the lung region is obtained, thus obtaining the segmentation image of the region of interest, and finally the pneumonia nidus is segmented in the region of interest, thereby obtaining the segmentation image of the pneumonia nidus. The method or system of the present disclosure is particularly suitable for solving the problem of precise segmentation of some pneumonia niduses, and is of great significance in subsequent precise quantitative analysis of some niduses. However, those skilled in the art can realize that the method or system of the present disclosure is not only suitable for segmentation of some pneumonia niduses, but also suitable for region segmentation of other viral pneumonia, bacterial pneumonia, and non-pulmonary inflammation.

In addition, according to an optional or preferred embodiment of the present disclosure, the present disclosure uses a combined process of the deep learning segmentation method, the threshold segmentation method, and the morphological operation, and after pre-segmentation is performed on the medical image data containing the lung region, pneumonia niduses are segmented by respectively using the deep learning segmentation method and the threshold segmentation method, the segmentation results obtained by the two segmentation methods are fused, and finally the fused segmentation result is optimized by using the morphological operation to obtain the segmentation image of the pneumonia niduses. The segmentation image obtained through the above combined process presents better effects than the segmentation image obtained through a single segmentation method.

Specifically, by combining the two segmentation methods, the sensitivity and precision of segmentation of pneumonia niduses can be greatly improved, and at the same time, the morphological operation is used in combination to remove some irrelevant tissues, thereby further improving the accuracy of pneumonia nidus segmentation.

Some exemplary embodiments have been described above. However, it should be understood that various modifications can be made to the exemplary embodiments described above without departing from the spirit and scope of the present disclosure. For example, an appropriate result can be achieved if the described techniques are performed in a different order and/or if the components of the described system, architecture, device, or circuit are combined in a different manner and/or replaced or supplemented with additional components or equivalents thereof. Accordingly, the modified other embodiments also fall within the protection scope of the claims.

The invention claimed is:

1. A method for segmenting a lung image, comprising:
obtaining medical image data containing a lung region;
performing lung lobe segmentation on the medical image data to generate a plurality of lung lobe data subsets;
generating updated lung image data based on one or a plurality of lung lobe data subsets in the plurality of lung lobe data subsets, wherein generating the updated lung image data comprises merging at least two lung lobe data subsets in the plurality of lung lobe data subsets and performing a morphological closing operation on the merged lung lobe data subset; and
performing nidus segmentation on the updated lung image data to generate a segmentation image that identifies a pneumonia nidus.

2. The method of claim 1, wherein before performing lung lobe segmentation on the medical image data, the medical image data is preprocessed, wherein preprocessing the medical image data comprises at least one of: cropping the medical image data; resampling the medical image data; and denoising the medical image data.

3. The method of claim 1, wherein performing lung lobe segmentation on the medical image data comprises: performing lung lobe segmentation on the medical image data by using a deep learning network or a threshold algorithm.

4. The method of claim 3, wherein performing lung lobe segmentation on the medical image data further comprises: performing a region growth algorithm on the medical image data that has undergone the lung lobe segmentation by using the deep learning network or the threshold algorithm.

5. The method of claim 4, wherein performing lung lobe segmentation on the medical image data further comprises: performing a morphological closing operation on the medical image data that has undergone the region growth algorithm.

6. The method of claim 1, wherein the plurality of lung lobe data subsets comprises data subsets corresponding to a right upper lobe, a right middle lobe, a right lower lobe, a left upper lobe, a left lower lobe, and an airway.

7. The method of claim 6, wherein the updated lung image data is lung segmentation image data generated based on the data subsets of the right upper lobe, the right middle lobe, the right lower lobe, the left upper lobe, and the left lower lobe.

8. The method of claim 1, wherein the plurality of lung lobe data subsets comprises a data subset corresponding to blood vessels, and the updated lung image data is blood vessel segmentation image data generated based on the data subset of the blood vessels.

9. The method of claim 1, wherein performing nidus segmentation on the updated lung image data comprises:
performing nidus segmentation on the updated lung image data by using a deep learning segmentation method to obtain first segmentation image data;
performing nidus segmentation on the updated lung image data by using a threshold algorithm to obtain second segmentation image data; and
fusing the first segmentation image data and the second segmentation image data to generate fused image data.

10. The method of claim 9, wherein performing nidus segmentation on the updated lung image data by using a deep learning segmentation method comprises:
performing data partitioning on the updated lung image data to generate a plurality of data blocks; and
performing nidus segmentation on each data block in the plurality of data blocks by using a deep learning segmentation network.

11. The method of claim 9, wherein performing nidus segmentation on the updated lung image data further comprises performing a morphological operation on the fused image data, the morphological operation comprising at least one of morphological erosion and dilation operations.

12. A system for segmenting a lung image, comprising:
a processor;
a computer readable storage medium in communication with the processor, wherein the processor executes computer readable instructions stored in the computer readable storage medium which cause the processor to:
obtain medical image data containing a lung region;
perform lung lobe segmentation on the medical image data to define a plurality of boundaries in the medical image data;
generate updated lung image data based on image data within one or a plurality of boundaries among the plurality of boundaries of the medical image data, wherein generating the updated lung image data comprises merging image data within at least two boundaries in the plurality of boundaries and performing a morphological closing operation on the merged image data; and
perform nidus segmentation on the updated lung image data to generate a segmentation image that identifies a pneumonia nidus.

13. The system of claim 12, wherein the computer readable instructions further cause the processor to:
perform at least one of the following operations on the medical image data: cropping the medical image data; resampling the medical image data; and denoising the medical image data.

14. The system of claim 12, wherein performing lung lobe segmentation on the medical image data comprises: performing lung lobe segmentation on the medical image data by using a deep learning network or a threshold algorithm.

15. The system of claim 14, wherein performing lung lobe segmentation on the medical image data further comprises: performing a region growth algorithm on the medical image data that has undergone the lung lobe segmentation by using the deep learning network or the threshold algorithm.

16. The system of claim 15, wherein performing lung lobe segmentation on the medical image data further comprises: performing a morphological closing operation on the medical image data that has undergone the region growth algorithm.

17. The system of claim 12, wherein the image data within the plurality of boundaries comprises image data corresponding to a right upper lobe, a right middle lobe, a right lower lobe, a left upper lobe, a left lower lobe, and an airway.

18. The system of claim 17, wherein the updated lung image data is lung segmentation image data generated based on the image data of the right upper lobe, the right middle lobe, the right lower lobe, the left upper lobe, and the left lower lobe.

19. The system of claim 12, wherein the image data within the plurality of boundaries comprises image data corresponding to blood vessels, and the updated lung image data is blood vessel segmentation image data generated based on the image data of the blood vessels.

20. The system of claim 12, wherein performing nidus segmentation on the updated lung image data comprises:
performing nidus segmentation on the updated lung image data by using a deep learning segmentation method to obtain first segmentation image data;
performing nidus segmentation on the updated lung image data by using a threshold algorithm to obtain second segmentation image data; and
fusing the first segmentation image data and the second segmentation image data to generate fused image data.

21. The system of claim 20, wherein performing nidus segmentation on the updated lung image data by using a deep learning segmentation method comprises:
performing data partitioning on the updated lung image data to generate a plurality of data blocks; and
performing nidus segmentation on each data block in the plurality of data blocks by using a deep learning segmentation network.

22. The system of claim 20, wherein performing nidus segmentation on the updated lung image data further comprises performing a morphological operation on the fused image data, the morphological operation comprising at least one of morphological erosion and dilation operations.

23. The system of claim 12, further comprising:
a medical imaging system configured to perform imaging scanning to generate medical image data;
a storage apparatus configured to store the medical image data; and
a medical imaging workstation or a medical image cloud platform analysis system communicatively connected to the storage apparatus, wherein the processor is comprised in the medical imaging workstation or the medical image cloud platform analysis system.

* * * * *